Aug. 15, 1939.   G. T. BALFE   2,169,516
GASKET
Filed Jan. 24, 1938
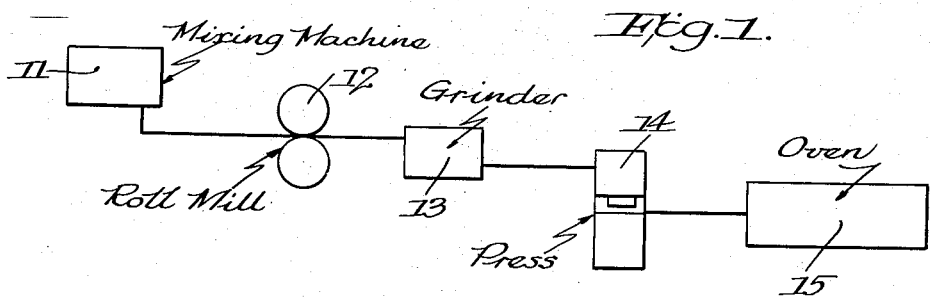
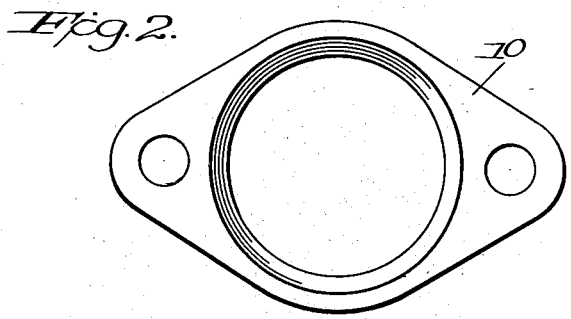
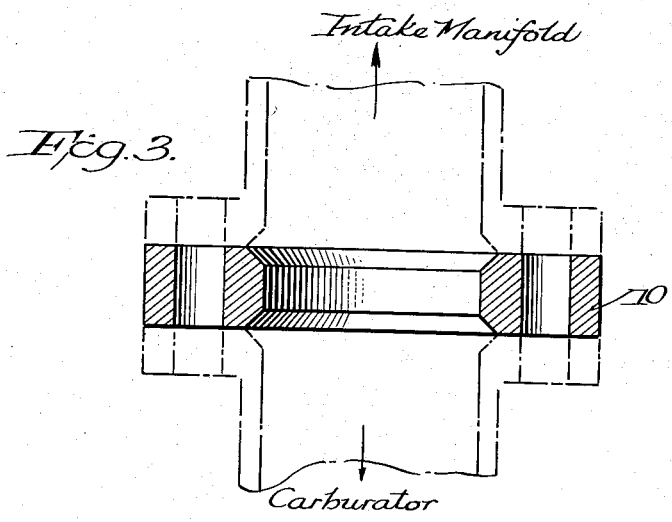
Inventor
George T. Balfe.
By Cushman Darby & Cushman
Attorneys Patented Aug. 15, 1939

2,169,516

UNITED STATES PATENT OFFICE 2,169,516

GASKET

George T. Balfe, Detroit, Mich., assignor to Detroit Gasket & Mfg. Company, Detroit, Mich., a corporation of Michigan Application January 24, 1938, Serial No. 186,700

1 Claim. (Cl. 288—33)

This invention relates to gaskets, and particularly gaskets of the insulator type useful at the joint between the carburetor and the manifold of an internal combustion engine to prevent overheating of the carburetor.

Numerous gaskets have been proposed for this purpose but either due to lack of required resistance or inability to seal irregularities in the joint surfaces, nearly all of these products include a core gasket and separate special gaskets on each side of the core for contact with the joint surfaces to seal the same.

The object of this invention is to eliminate such built up gaskets, and to provide a single integral insulator gasket.

The gasket of the present invention consists of a mixture of a synthetic resin of the heat hardenable type and an insulating material such as asbestos in finely divided state. This gasket has the required insulative properties and is characterized by resistance to heat, water, gas and oil. The percentage relationship of insulating material to resin and the density of the gasket are such, that the gasket is compressible, whereby it is self-sealing and is non-absorbent and impermeable to liquids and gases. At the same time the gasket is rigid enough to be machined and is resistant to fracture when compressed between and in direct contact with the surfaces of the joint.

Gaskets of synthetic resin and insulating material are described in the patent to Baekland, 941,605, November 30, 1909, but there is no teaching of an insulator gasket having the qualities above defined, all of which are essential for a satisfactory product.

I have discovered that certain critical conditions must be observed in the manufacture of a suitable insulator gasket in order that it will have the above desired properties. For example, the asbestos must be in finely ground condition and its admixture with the potentially reactive resin must be quite thorough and the resin must likewise be in finely divided condition. Furthermore, there are definite critical limits as to the ratio of the content of resin and insulating material. Also, in making the product, the mixture of resin and insulating material must first be compressed in the cold under a critical pressure to form a product which is self-sustaining and which on heating to cure the resin will have the desired final qualities. That is to say, when the molded product of this invention is subjected to heat to effect curing of the resin, a non-absorbent, impermeable, strong and compressible gasket is formed which is not affected by the high temperatures to which insulator gaskets are subjected.

Referring to the drawing:

Figure 1 is a diagrammatic view of a method employed for making the gasket;

Figure 2 is a perspective view of an insulator gasket made in accordance with this invention; and Figure 3 shows the gasket applied at the joint between a carburetor and the manifold.

Referring to Figure 2, the gasket 10 is shown as of conventional shape for use between the manifold and carburetor of an internal combustion engine assembly illustrated in Figure 3. Of course, this product can be made in various shapes and sizes as required and may be generally used to seal joints.

In preparing the gasket, and referring to Figure 1, any suitable insulating material, preferably asbestos, in finely divided or powdered state is thoroughly mixed in a mixing machine 11 with a potentially reactive synthetic resin, likewise in finely divided or powdered state. The resin is preferably of the phenol formaldehyde type but practically any of the heat hardenable resins available may be used, bearing in mind the final properties which the gasket need possess. The mixture is then passed through a suitable mill 12 comprising a pair of rotating rolls which become heated as they compress the mixture between them. This heating will serve to reduce the moisture content of the asbestos, but is insufficient to affect the resin. The mixture issues from the mill in the form of relatively thin compressed sheets or strips. These compressed cakes of the resin-asbestos mixture are then ground to a very fine condition in any suitable type of mill as shown at 13; an additional amount of resin being added as required. The mixture is then compressed in a cold mold 14 to the shape shown in Figure 1, or other desired shape, and the self-sustaining product is then treated in the oven 15 to cure the resin and form the final gasket. If required, machining of the gasket may be accomplished, but this is not always necessary.

As an example of the critical range of percentage relationship of the constituents of the mixture, I have discovered that the ratio of finely divided asbestos to finely divided resin should be between about 4:1 to 3:2. In the case of a product having a ratio of asbestos to resin of about 3 to 2, a pressure of 40 tons in the molding apparatus 14 has been found satisfactory. The density of the gasket can, of course, be controlled by the molding pressure which is relatively high, but the final product in all cases is a compact body, is impermeable and non-absorbent to liquids and gases; and the fibres or other insulating material are strongly bonded.

In some cases and preferably at the time the resin is added at the second stage of the method, i. e., to the grinding mill 13, a small percentage of lubricant, e. g., 1% of calcium stearate, may be added, but this is not always required.

By having a strong gasket possessed of the desired compressibility, the use of superposed gaskets is eliminated and the gasket has the property of self-sealing, i. e., conforming to any irregularities in the joint surfaces.

Insulator gaskets usually have a substantial thickness as shown, for example ⅝", and the gasket of this invention may be made of any required dimension.

The gasket and its method of manufacture may be modified in various ways, but all changes within the scope of the invention are considered to be comprehended in the appended claim.

I claim:

An insulator gasket of integral, unitary construction sufficiently compressible to provide a good seal and impermeable to water, gas and oil, comprising a mixture of compressible insulating material, such as asbestos, in finely divided state having uniformly distributed therethrough a heat-hardened synthetic resin, the relationship of insulating material to resin being of the order between 4:1 and 3:2 and the mixture being pressed to shape under a compression sufficient to provide a self-sustaining form and to impart the desired gasket strength and density and being finally cured by heat treatment.

GEORGE T. BALFE.